US00RE48925E

(19) United States
(12) Reissued Patent
Takizawa

(10) Patent Number: US RE48,925 E
(45) Date of Reissued Patent: Feb. 8, 2022

(54) INFORMATION PROCESSING APPARATUS, METHOD FOR CONTROLLING POWER STATE SHIFT AND CLEARING OR NOT CLEARING A SHIFT TIME MEASURED

(71) Applicant: CANON KABUSHIKI KAISHA, Tokyo (JP)

(72) Inventor: Masahiro Takizawa, Kawasaki (JP)

(73) Assignee: Canon Kabushiki Kaisha, Tokyo (JP)

(21) Appl. No.: 15/933,182

(22) Filed: Mar. 22, 2018

Related U.S. Patent Documents

Reissue of:
(64) Patent No.: 9,292,075
Issued: Mar. 22, 2016
Appl. No.: 13/897,247
Filed: May 17, 2013

(30) Foreign Application Priority Data

May 23, 2012 (JP) ..... 2012-117752

(51) Int. Cl.
*G06F 1/32* (2019.01)
*G06F 1/3234* (2019.01)
(Continued)

(52) U.S. Cl.
CPC ..... *G06F 1/3234* (2013.01); *G06F 1/3203* (2013.01); *G06F 1/3278* (2013.01); *G06F 1/3287* (2013.01); *Y02D 10/00* (2018.01)

(58) Field of Classification Search
CPC ..... G06F 1/32; G06F 1/3203; G06F 1/3209; G06F 1/3215; G06F 1/3228; G06F 3/1221; G06F 3/1229; G06F 1/266; G06F 1/1616; G06F 1/3284; G03G 15/5004; G03G 15/50; G03G 15/2003; G03G 15/2064; H04L 69/28; H04L 12/12; H04L 12/66; H04N 1/00204; H04N 1/00885; H04N 1/00; B41J 29/393; B41J 3/4075
(Continued)

(56) References Cited

U.S. PATENT DOCUMENTS 5,581,668 A * 12/1996 Oida ..... G06F 1/3215 358/1.14
5,844,813 A * 12/1998 Tateyama ..... G06F 1/1616 700/295
(Continued)

FOREIGN PATENT DOCUMENTS

JP 08-076653 * 3/1996 ..... G03G 21/00378
JP 8-076653 A 3/1996
(Continued)

*Primary Examiner* — Christopher E. Lee
(74) *Attorney, Agent, or Firm* — Canon U.S.A., Inc. I.P. Division

(57) ABSTRACT

An information processing apparatus operating in a first power state, a second power state, a third power state, and fourth power state includes a power control unit configured to the third power state to the fourth power state when a first shift time is measured, and a control unit configured to, when the power control unit has shifted the power state of the information processing apparatus from the third power state to the first power state, clear the measured time and not to, when the power control unit has shifted the power state of the information processing apparatus from the third power state to the second power state, clear the measured time clear.

23 Claims, 12 Drawing Sheets

(51) Int. Cl.
*G06F 1/3287* (2019.01)
*G06F 1/3203* (2019.01)

(58) Field of Classification Search
USPC ..... 713/300, 320, 321, 323, 324; 709/223, 709/224, 245; 358/1.13, 1.14, 1.15; 399/88, 43, 70; 700/40, 295; 370/389; 400/76; 710/8
See application file for complete search history.

(56) References Cited

U.S. PATENT DOCUMENTS 5,881,335 A * 3/1999 Yang ..... G03G 15/2003 399/70
5,884,122 A * 3/1999 Kawabuchi ..... G03G 15/50 399/43
7,447,757 B2 * 11/2008 Muto ..... G06F 1/3203 709/223
7,474,431 B2 * 1/2009 Yamano et al. ..... G06F 1/3203 358/1.15
7,543,165 B2 * 6/2009 Inoue ..... 713/300
7,796,588 B2 * 9/2010 Nakamura ..... H04L 12/12 370/389
8,451,471 B2 * 5/2013 Koga ..... 358/1.14
8,977,872 B2 * 3/2015 Hikichi ..... 713/320
2005/0128515 A1 * 6/2005 Ohno ..... H04N 1/00204 358/1.15
2006/0010331 A1 * 1/2006 Ohara ..... G06F 1/3215 713/323
2007/0079006 A1 * 4/2007 Oya ..... G06F 3/1221 709/245
2007/0124513 A1 * 5/2007 Kikuchi ..... H04L 12/66 710/8
2007/0260337 A1 * 11/2007 Sugiyama ..... G06F 1/32 700/40
2008/0144086 A1 * 6/2008 Shibao ..... H04N 1/00244 358/1.15
2008/0279578 A1 * 11/2008 Monde ..... G03G 15/2064 399/70
2009/0010671 A1 * 1/2009 Hashimoto ..... G03G 15/5004 399/88
2009/0164816 A1 * 6/2009 Yasuda ..... B41J 29/393 713/320
2009/0282278 A1 * 11/2009 Satoh ..... G06F 1/3209 713/321
2009/0287945 A1 * 11/2009 Kim ..... G06F 1/3228 713/323
2009/0313493 A1 * 12/2009 Ide ..... 713/323
2010/0253965 A1 * 10/2010 Ogisu ..... G03G 15/5004 358/1.14
2010/0262691 A1 * 10/2010 Shouno ..... H04L 69/28 709/224
2011/0004776 A1 * 1/2011 Tanaka ..... H04N 1/00885 713/323
2011/0007339 A1 * 1/2011 Negishi ..... G06F 3/1221 358/1.14
2011/0069343 A1 * 3/2011 Tsuchitoi ..... G06F 1/3215 358/1.15
2011/0078465 A1 * 3/2011 Ito ..... G06F 1/3203 713/300
2011/0083027 A1 * 4/2011 Takagi ..... G06F 1/3284 713/323
2011/0134477 A1 * 6/2011 Kuwahara et al. ..... 358/1.15
2011/0142519 A1 * 6/2011 Tsukuda ..... B41J 3/4075 400/76
2011/0191614 A1 * 8/2011 Tsuzuki ..... G06F 1/32 713/320
2011/0249291 A1 * 10/2011 Tsuzuki ..... H04N 1/00 358/1.15
2011/0264942 A1 * 10/2011 Tsukamoto ..... G06F 1/266 713/324
2011/0286027 A1 * 11/2011 Nozawa ..... G03G 15/5004 358/1.14
2011/0296219 A1 * 12/2011 Okuda ..... G03G 15/5004 713/323
2011/0314311 A1 * 12/2011 Maeda ..... G06F 1/3209 713/320
2012/0224206 A1 * 9/2012 Takahashi ..... G06F 3/1229 358/1.13

FOREIGN PATENT DOCUMENTS

JP 2003163769 A * 6/2003
JP 2013-246491 A 12/2013
JP 6282320 B2 2/2018

* cited by examiner

INFORMATION PROCESSING APPARATUS, METHOD FOR CONTROLLING POWER STATE SHIFT AND CLEARING OR NOT CLEARING A SHIFT TIME MEASURED

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to an information processing apparatus that takes a plurality of power states, and a method for controlling the information processing apparatus.

2. Description of the Related Art

Techniques for suppressing power consumption of a network-connected information processing apparatus such as a multi function peripheral (MFP) and a printer have heretofore been discussed. Among the known techniques for suppressing the power consumption is one that shifts the information processing apparatus to a low power consumption state if the information processing apparatus has not been operated for a certain time. For further power saving from the low power consumption state, a technique for automatically powering off the information processing apparatus if the information processing apparatus in the low power consumption state has not been operated for a certain time (shutdown shift time) has been known (hereinafter, referred to as an automatic shutdown function; see Japanese Patent Application Laid-Open No. 08-076653).

In the above-described low power consumption state, a power supply to a network interface card (NIC) for receiving packets is maintained to monitor packets transmitted from a computer on the network. If the information processing apparatus returns from the low consumption state to a normal power state to make a response to every packet that the NIC receives, the power consumption of the information processing apparatus eventually becomes high.

A technique called proxy response has been discussed. The proxy response refers to a technique that provides the NIC with a function of responding to a specific packet or packets. With the proxy response, the NIC responds to the specific packet(s) with the information processing apparatus remaining in the low power consumption state (without the information processing apparatus returning to the normal power state). This can reduce the power consumption of the information processing apparatus because the time during which the information processing apparatus is in the low power consumption state increases. If the NIC receives a packet other than the specific packet(s), the NIC can make no proxy response and the information processing apparatus needs to be restored from the low power consumption state to the normal power state. When a packet to which no proxy response can be made is received, the information processing apparatus, which is restored to the normal power supply, makes a response to the packet.

The information processing apparatus that makes a proxy response in the low power consumption state can respond to the specific packet(s) transmitted from an external apparatus while remaining in the low power consumption state. However, the information processing apparatus cannot respond to a packet other than the specific packet(s) while remaining in the low power consumption state. In an environment where the information processing apparatus frequently receives packets to which no proxy response can be made, the information processing apparatus frequently returns from the low power consumption state to the normal power state. In such an environment, the shutdown shift time to elapse before activation of the above-described automatic shutdown function stops being measured each time the information processing apparatus returns to the normal power state. The automatic shutdown function therefore will not be executed despite its existence. As a result, the information processing apparatus keeps failing to enter an off state.

SUMMARY OF THE INVENTION

The present invention is directed to an information processing apparatus capable of preventing the shutdown shift time from stopping being measured when the information processing apparatus returns from the low power consumption state to the normal power state because of a specific return factor.

According to an aspect of the present invention, an information processing apparatus operating in a first power state, a second power state with power consumption lower than that of the first power state, a third power state with power consumption lower than that of the second power state, and a fourth power state with power consumption lower than that of the third power state, includes a time measurement unit configured to measure time, a power control unit configured to shift a power state of the information processing apparatus which is in the third power state (1) from the third power state to the fourth power state when a first shift time is measured by the time measurement unit, (2) from the third power state to the second power state when a first shift factor for shifting the information processing apparatus from the third power state to the second power state occurs before the first shift time is measured by the time measurement unit, and (3) from the third power state to the first power state when a second shift factor for shifting the information processing apparatus from the third power state to the first power state occurs before the first shift time is measured by the time measurement unit, and a control unit configured to, when the power control unit has shifted the power state of the information processing apparatus from the third power state to the first power state, clear the time measured by the time measurement unit, and when the power control unit has shifted the power state of the information processing apparatus from the third power state to the second power state, not to clear the time measured by the time measurement unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<Overall Configuration of Printing System>

Figure 1:
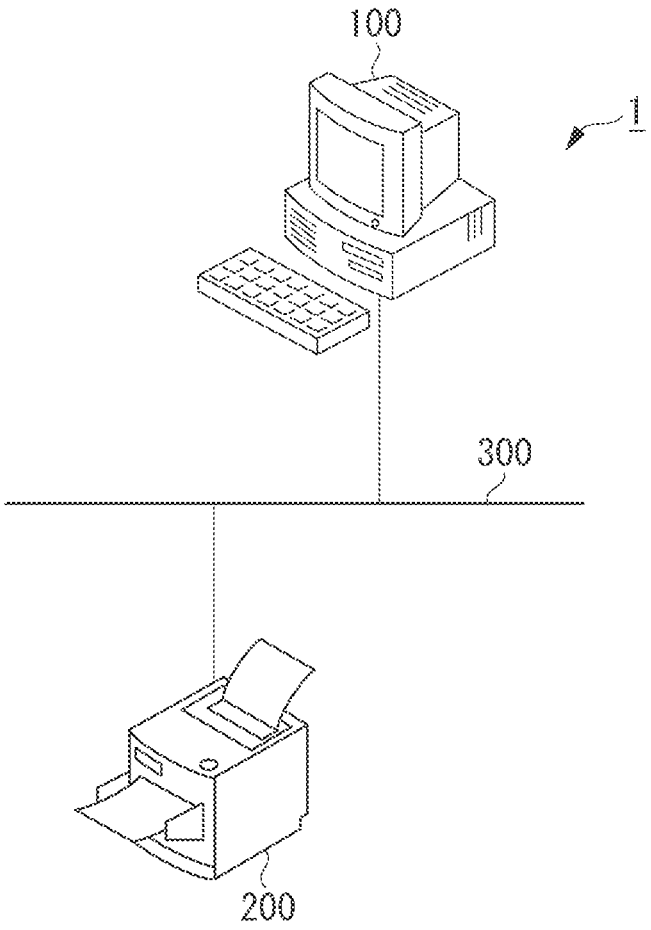
FIG. 1 is a diagram illustrating an overall configuration of a printing system including an MFP according to a first exemplary embodiment.

FIG. 1 is a diagram illustrating an overall configuration of a printing system 1 including an MFP according to a first exemplary embodiment of the present invention. As illustrated in FIG. 1, the printing system 1 according to the first exemplary embodiment includes a host computer (hereinafter, referred to as a personal computer (PC)) 100, and an MFP 200 which can be connected to the PC 100 via a network 300. In the printing system 1, the PC 100 and the MFP 200 communicate through a bidirectional interface. The bidirectional interface may be a wired one such as a local area network (LAN) and a Universal Serial Bus (USB), and a wireless one such as a wireless LAN.

The MFP 200 has a plurality of functions including those of a printer, a scanner, a copying machine, and a facsimile machine.

A printer driver is installed in the PC 100. The PC 100 transmits print data to the MFP 200.

<Power Supply Circuit of MFP>

Figure 2:
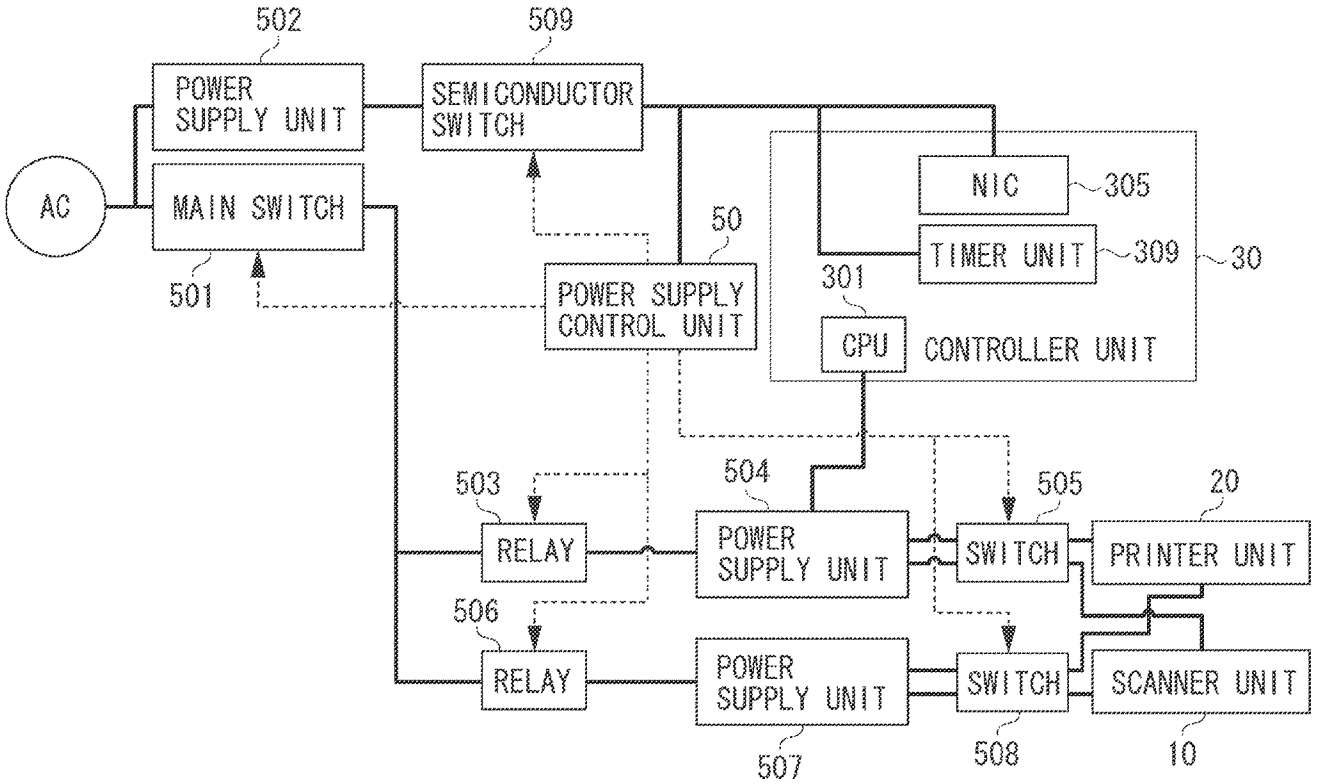
FIG. 2 is a diagram illustrating a configuration of a power supply circuit of the MFP.

FIG. 2 is a block diagram illustrating a power supply control of the MFP 200.

The MFP 200 is connected to an alternating-current power supply AC. A main switch 501 and a power supply unit 502 are connected to the alternating-current power supply AC. A relay 503, a power supply unit 504, and a switch 505 are arranged between the main switch 501 and a printer unit 20. A relay 506, a power supply unit 507, and a switch 508 are arranged between the main switch 501 and a scanner unit 10.

The main switch 501 controls on and off of the power supplied from the alternating-current power supply AC to each part of the MFP 200. The main switch 501 is a solenoid switch including a switch and an actuator. The switch can be manually or automatically turned off. The actuator includes a solenoid and an iron core (arranged inside the solenoid). Passing a current through the solenoid actuates the iron core, whereby the switch can be automatically turned off.

The power supply unit 502 converts an alternating-current power supply supplied from the alternating-current power supply AC into a direct-current power supply, and supplies the direct-current power supply to a controller unit 30. For example, the power supply unit 502 supplies a voltage of 3.3 V to the controller unit 30. A semiconductor switch 509 is arranged between the power supply unit 502 and the controller unit 30.

The power supply unit 504 converts the alternating-current power supply supplied from the alternating-current power supply AC into a direct-current power supply, and supplies the direct-current power supply to the controller unit 30, the printer unit 20, and the scanner unit 10. For example, the power supply unit 504 supplies a voltage of 12 V to the controller unit 30, the printer unit 20, and the scanner unit 10. The power supply unit 507 converts the alternating-current power supply supplied from the alternating-current power supply AC into a direct-current power supply, and supplies the direct-current power supply to the printer unit 20 and the scanner unit 10. For example, the power-supply unit 507 supplies a voltage of 24 V to the printer unit 20 and the scanner unit 10.

The main switch 501, the relays 503 and 506, the switches 505 and 508, and the semiconductor switch 509 are all controlled on/off by a power supply control unit 50.

Figure 7:
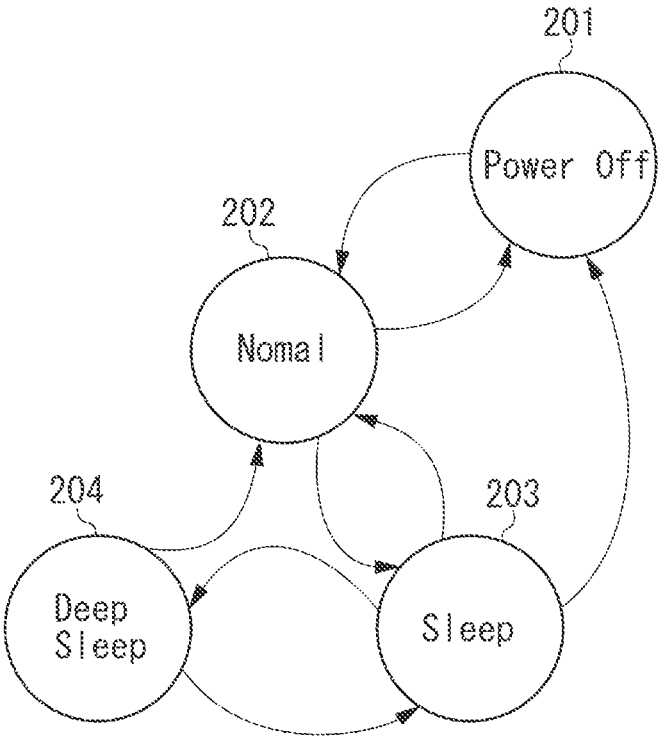
FIG. 7 is a state transition diagram illustrating power states of the MFP.

As illustrated in FIG. 7, the MFP 200 according to the present exemplary embodiment takes any one of a normal state (first power state) 202, a sleep state (first power state) 203 which saves power more than the normal state 202, a deep sleep state (second power state) 204 which saves power more than the sleep state 203, and a power off state (third power state) 201 which saves power more than the deep sleep state (second power state) 204.

When the MFP 200 is in the normal state 202, the main switch 501, the relays 503 and 506, the switches 505 and 508, and the semiconductor switch 509 are all turned on. In the normal state 202, the power supply unit 502 supplies power to the controller unit 30. In the normal state 202, the power supply unit 504 supplies power to the controller unit 30, the printer unit 20, and the scanner unit 10. In the normal state 202, the power supply unit 507 supplies power to the printer unit 20 and the scanner unit 10. In the normal state 202, the power supply units 502 and 504 both supply power to various parts of the controller unit (for example, a central processing unit (CPU) 301, a NIC 305, and a timer unit 309).

When the MFP 200 is in the sleep state 203, the main switch 501, the relays 503 and 506, and the semiconductor switch 509 are turned on. The switches 505 and 508 are turned off. In the sleep state 203, the power supply units 502 and 504 both supply power to various parts of the controller unit 30 (for example, the CPU 301, the NIC 305, and the timer unit 309). Since the switches 505 and 508 are turned off, no power is supplied to the printer unit 20 or the scanner unit 10.

When the MFP 200 is in the deep sleep state 204, the main switch 501 and the semiconductor switch 509 are turned on. The relays 503 and 506 and the switches 505 and 508 are turned off. In the deep sleep state 204, the power supply unit 502 supplies power to the controller unit 30 while the power supply unit 504 supplies no power to the controller unit 30. Consequently, the NIC 305 and the timer unit 309 of the controller unit 30 are supplied with power and the CPU 301 is not. Since the relays 503 and 506 are turned off, no power is supplied to the printer unit 20 or the scanner unit 10.

When the MFP 200 is in the power off state 201, the main switch 501, the relays 503 and 506, the switches 505 and 508, and the semiconductor switch 509 are all turned off. The power supply to each part of the MFP 200 is thus stopped.

<About Details of MFP>

Figure 3:
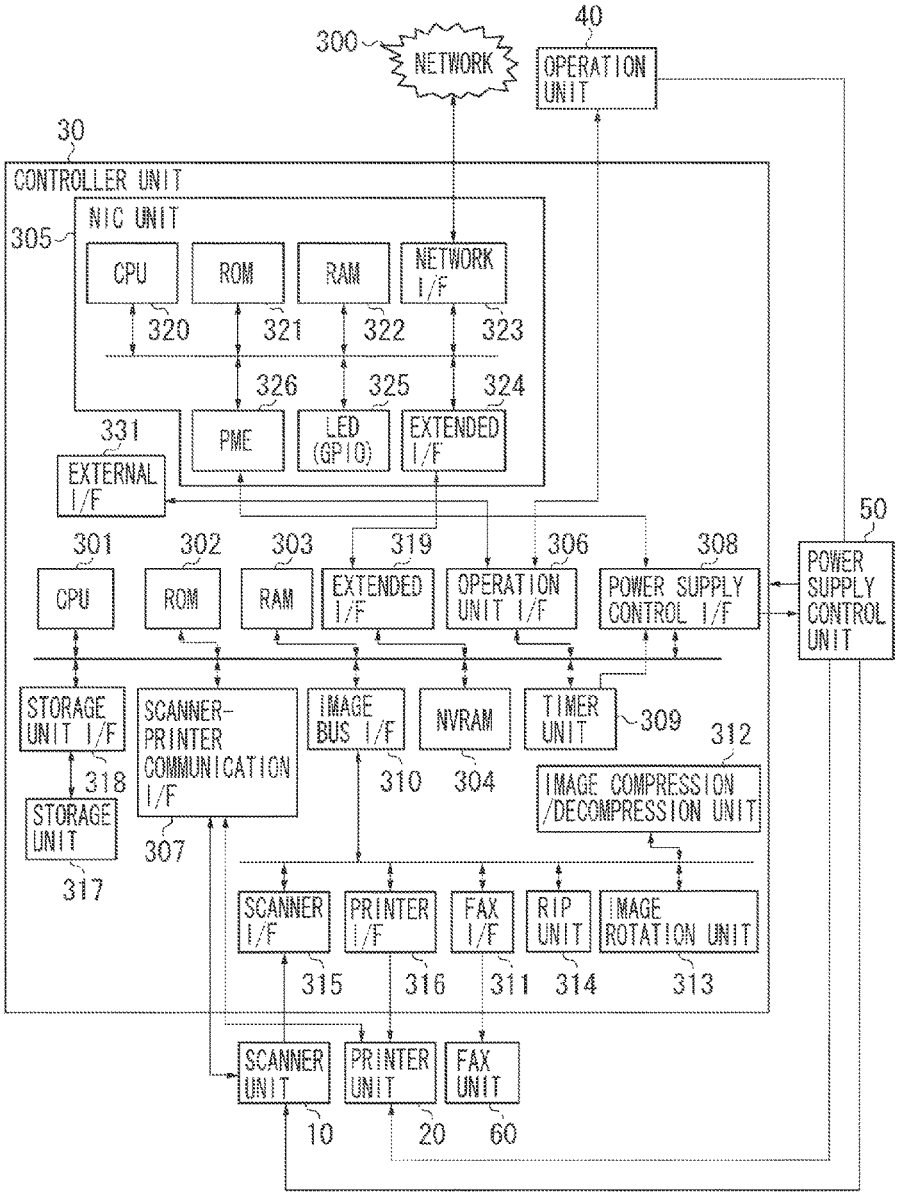
FIG. 3 is a hardware block diagram of the MFP.

FIG. 3 is a hardware block diagram illustrating the details of the MFP 200 according to the first exemplary embodiment of the present invention.

The MFP 200 includes the scanner unit 10, the printer unit 20, the controller unit 30, an operation unit 40, the power supply control unit 50, and a facsimile (FAX) unit 60.

The scanner unit 10 reads a document placed by a user, and generates image data. For example, the scanner unit 10 exposes a document placed on a document positioning glass plate to light from a document illumination lamp including a halogen lamp. The scanner unit 10 receives reflected light from the document by using a charge-coupled device (CCD) sensor, and outputs the resultant as an image signal.

The printer unit 20 exposes a photosensitive member based on the image data to form an electrostatic latent image. The printer unit 20 develops the formed electrostatic latent image with a developer (toner), and transfers the resultant to a sheet to form an image.

The FAX unit 60 receives FAX data transmitted from an external apparatus, and converts the FAX data into printable image data.

The scanner unit 10, the printer unit 20, and the FAX unit 60 may include typical configurations and functions of conventional scanners, printers, and facsimiles. A detailed description of typical functions and structures as an image processing apparatus will be omitted.

The operation unit 40 includes various keys for accepting user's operations, and a display unit that displays various types of setting information about printing and a scanner.

The power supply control unit 50 controls the power supply to the scanner unit 10, the printer unit 20, the controller unit 30, the operation unit 40, and the FAX unit 60 according to an instruction transmitted from a power supply control interface (I/F) 308 of the controller unit 30.

The controller unit 30 is connected to the scanner unit 10 which serves as an image reading device, the printer unit 20 which serves as an image forming device, the FAX unit 60, and the operation unit 40 which serves as a user interface.

The controller unit 30 includes the CPU 301, a read-only memory (ROM) 302, a random access memory (RAM) 303, a nonvolatile random access memory (NVRAM) 304, the NIC 305, the timer unit 309, and a storage unit 317. The controller unit 30 further includes an operation unit I/F 306, a scanner-printer communication I/F 307, the power supply control I/F 308, an image bus I/F 310, a FAX I/F 311, a scanner I/F 315, a printer I/F 316, a storage unit I/F 318, an extended I/F 319, and an external I/F 331. The controller unit 30 further includes an image compression/decompression unit 312, an image rotation unit 313, and a raster image processor (RIP) unit 314.

The CPU 301 executes various programs including a control processing routine to be described below. The ROM 302 contains various programs including a boot program for the CPU 301 to operate with and the control processing routine. The RAM 303 is used as a work area and/or an image memory serving as a temporary storage location of image data when the CPU 301 executes various programs. The NVRAM 304 is a nonvolatile RAM that stores various control parameters.

The NIC 305 is connected to a LAN, and performs various network controls such as transmission and reception of electronic mails and reception of page description language (PDL) data transmitted from the PC 100. The NIC 305 will be described in detail below.

The operation unit I/F 306 is an I/F for communicating with the operation unit 40 to be described below. The scanner-printer communication I/F 307 is an interface for communicating with the scanner unit 10 and the printer unit 20 described above. The power supply control I/F 308 is an interface between the CPU 301, NIC 305, and timer unit 309 and the power supply control unit 50. Receiving a power supply controlling signal from the NIC 305 or the timer unit 309, the power supply control I/F 308 in response thereto issues an instruction about the power supply to various units of the MFP 200 including the scanner unit 10, the printer unit 20, the controller unit 30, the operation unit 40, and the FAX unit 60. Examples of the power supply controlling signal include a PME# signal of the Peripheral Component Interconnect (PCI) standard, and a WAKE# signal of the PCI Express standard. The timer unit 309 measures the current time. At least one or more time settings are possible in the timer unit 309, and measures time to see whether the set time(s) has/have elapsed.

The storage unit I/F 318 is an I/F for connecting the storage unit 317. An example of the storage unit I/F 318 is a Serial Advanced Technology Attachment (SATA). The extended I/F 319 is a bus for performing transmission and reception with the NIC 305. Examples of the extended I/F 319 include PCI and PCI Express buses. The extended I/F 319 is connected to an extended I/F 324 on the NIC side by the same type of bus. The CPU 301, the ROM 302, the RAM 303, the NVRAM 304, the operation unit I/F 306, the scanner-printer communication I/F 307, the power supply control I/F 308, the timer unit 309, the storage unit I/F 318, and the extended I/F 319 are connected to a system bus 400. The storage unit 317 connected to the storage unit I/F 318 is a nonvolatile storage device for storing programs and/or data. Examples of the storage unit 317 include a hard disk and a flash memory.

The image bus I/F 310 is a bridge that connects the system bus 400 with an image bus 401 for transferring an image signal. The image compression/decompression unit 312, the image rotation unit 313, the RIP unit 314, the scanner I/F unit 315, the printer I/F unit 316, and the FAX I/F 311 are connected to the image bus 401.

The image compression/decompression unit 312 performs Joint Photographic Experts Group (JPEG), Joint Bi-level Image Experts Group (JBIG), Modified Read (MMR), and Modified Huffman (MH) compression and decompression processing. The image rotation unit 313 performs image data rotation processing. The RIP unit 314 rasterizes PDL code into a bitmap raster image. The scanner I/F unit 315 is an interface for connecting the scanner unit 10. The scanner I/F 315 performs scanner image processing such as correction, processing, and editing on data read by the scanner unit 10. The printer I/F unit 316 performs printer image processing such as printer correction and resolution conversion on image data intended for print output, and transfers image-processed print data to the printer unit 20. The FAX I/F 311 is an interface for connecting the FAX unit 60. The FAX I/F 311 performs facsimile image processing such as image decompression, correction, processing, and editing on compressed image data received by the FAX unit 60. The FAX I/F 311 further performs facsimile image processing such as facsimile image compression, correction, and resolution conversion on image data intended for facsimile transmission, and transfers print data to the FAX unit 60.

The external I/F 331 is an I/F for connecting an external device to the MFP 200. Examples of the extended I/F 331 include a USB and an identification (ID) card reader I/F.

<Details of NIC>

Next, the NIC 305 will be described in detail.

As illustrated in FIG. 3, the NIC 305 includes a CPU 320, a ROM 321, a RAM 322, a network I/F 323, the extended I/F 324, a light-emitting diode (LED) 325, and a power management event (PME) 326.

The CPU 320 executes various programs including a control processing routine. The ROM 321 contains various programs including a boot program for the CPU 320 to operate with and the control processing routine, and various parameters needed for network control such as a Media Access Control (MAC) address. The RAM 322 is used as a work area and a temporary storage location of packets when the CPU 320 executes various programs. Examples of the network I/F 323 include the Institute of Electrical and Electronics Engineering (IEEE) 802.3 and its extensions. The extended I/F 324 is a bus for connecting the NIC 305 and the system bus 400. Examples of the extended I/F 324 include PCI and PCI Express interfaces. The extended I/F 324 is connected to the same type of interface as that of the above-described extended I/F 319. The LED 325 includes an LED connected via a general purpose input/output (GPIO), and functions as an indicator for indicating a status of the NIC 305. For example, the LED 325 can indicate the state of electrical connection between the network I/F 323 and the network 300 and various operation states including a communication mode by using the LED's colors or blink patterns. The PME 326 is an interface for notifying an event intended for power management to the power supply control I/F 308. For example, the PME 326 transmits a signal used in a wake on LAN, such as a PME# signal of the PCI standard or a WAKE# signal of the PCI Express standard, to the power supply control I/F 308 via a GPIO.

<Configuration of Timer Unit>

Figure 4:
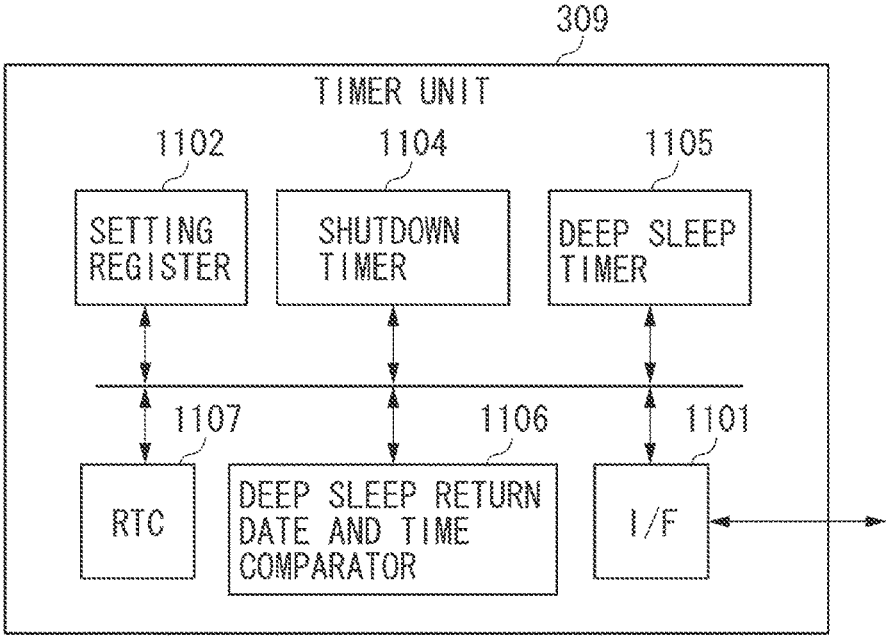
FIG. 4 is a block diagram of a timer unit of the MFP

FIG. 4 is a block diagram illustrating a configuration of the timer unit 309 in the MFP 200. The configuration of the timer unit 309 will be described in detail with reference to FIG. 4. The timer unit 309 includes an I/F 1101, a timer setting register 1102, a shutdown timer 1104, a deep sleep timer 1105, a deep sleep return date and time comparator 1106, and a real time clock (RTC) 1107.

The I/F 1101 is a bridge that is connected to the above-described system bus 400 (see FIG. 3) and a bus in the timer unit 309. The timer setting register 1102 is a register for storing timer settings. For example, the timer setting register 1102 includes a memory that can retain values, like a static random access memory (SRAM), a dynamic random access memory (DRAM), and an electrically erasable programmable read-only memory (EEPROM). The shutdown timer 1104 is a counter for measuring a duration of the deep sleep state 204. When in the deep sleep state 204, the shutdown timer 1104 decrements its counter at regular time intervals, and if the counter becomes zero, issues an alarm. The power supply control unit 50 receives the alarm through the power supply control I/F 308, and supplies power to the CPU 301 whose power supply has been stopped in the deep sleep state 204. The power-supplied CPU 301 performs end processing of an operating system (OS). After the end of the end processing performed by the CPU 301, the power supply control unit 50 makes a power state of the MFP 200 transition to the power off state 201. The deep sleep timer 1105 is a counter for measuring a duration of the normal state 202 or the sleep state 203. In the normal state 202 or the sleep state 203, the deep sleep timer 1105 decrements its counter at regular time intervals, and if the counter becomes zero, issues an alarm. The CPU 301 receives the alarm through the power supply control I/F 308, and performs processing for shifting to the deep sleep state 204. After the end of the processing for shifting to the deep sleep state 204, the power supply control unit 50 makes the power state of the MFP 200 transition to the deep sleep state 201. The deep sleep return date and time comparator 1106 is a circuit that issues an alarm for returning from the deep sleep state 204 to the normal state 202 at a preset date and time. For example, the deep sleep return date and time comparator 1106 compares a deep sleep return date and time set in a deep sleep return date and time setting value 1303 of the timer setting register 1102 to be described below with a current date and time of the RTC 1107. If the dates and times coincide, the deep sleep return date and time comparator 1106 notifies an alarm. The power supply control unit 50 receives the alarm through the power supply control I/F 308, and makes the power state of the MFP 200 return from the deep sleep state 204 to the normal state 202. Being supplied with power due to the alarm, the CPU 301 performs a specific operation 1 or specific operation 2 to be described below.

<Structure of Setting Register>

Figure 5:
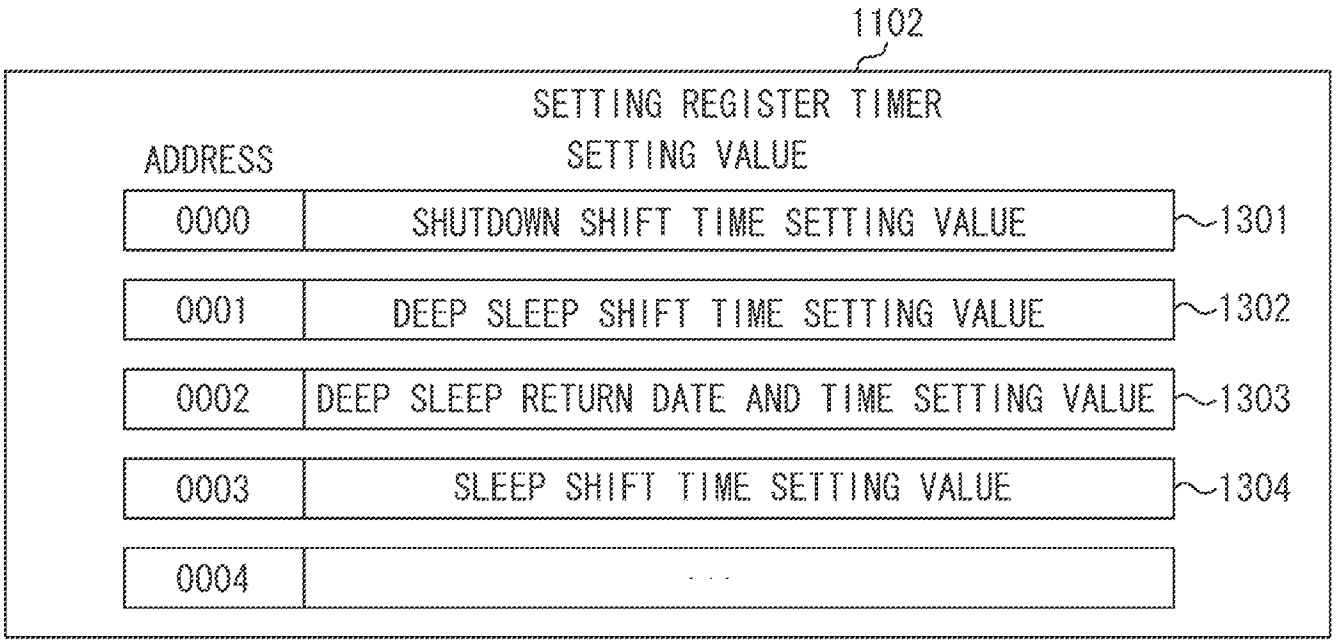
FIG. 5 is a block diagram of a setting register of the timer unit of the MFP.

FIG. 5 is a diagram illustrating the timer setting register 1102 of the above-described timer unit 309. The timer setting register 1102 has setting values including a shutdown shift time setting value 1301, a deep sleep shift time setting unit 1302, a deep sleep return date and time setting value 1303, and a sleep shift time setting value 1304. The shutdown shift time setting value 1301 indicates a time (shutdown shift time (first shift time)) to elapse before the MFP 200 shifts from the deep sleep state 204 to the power off state 201. If the shutdown shift time has elapsed with the MFP 200 in the deep sleep state 204, the MFP 200 shifts from the deep sleep state 204 to the power off state 201. The shutdown shift time is a time set by the user by using a setting screen to be described below (see FIG. 6). The deep sleep shift time setting value 1302 indicates a time (deep sleep shift time) to elapse before the MFP 200 shifts from the sleep state 203 to the deep sleep state 204. If the deep sleep shift time has elapsed with the MFP 200 in the sleep state 203, the MFP 200 shifts from the sleep state 203 to the deep sleep state 204. The deep sleep return date and time setting value 1303 is a memory that stores the date and time for the deep sleep return date and time comparator 1106 to compare. The date and time set by the deep sleep return date and time setting value 1303 is the date and time to perform a specific operation. While the present exemplary embodiment deals with a case where the specific operation is performed at the date and time set by the deep sleep return date and time setting value 1303, the specific operation may be controlled to be performed at predetermined time intervals. The sleep shift time setting value 1304 indicates a time (sleep shift time) to elapse before the MFP 200 shifts from the normal state 202 to the sleep state 203. If the sleep shift time has elapsed with the MFP 200 in the normal state 202, the MFP 200 shifts from the normal state 202 to the sleep state 203. While FIG. 5 illustrates addresses corresponding to the above-described respective setting values 1301 to 1304, it will be understood that an exemplary embodiment of the present invention is not limited to such address values.

<Setting of Shutdown Shift Time>

Figure 6:
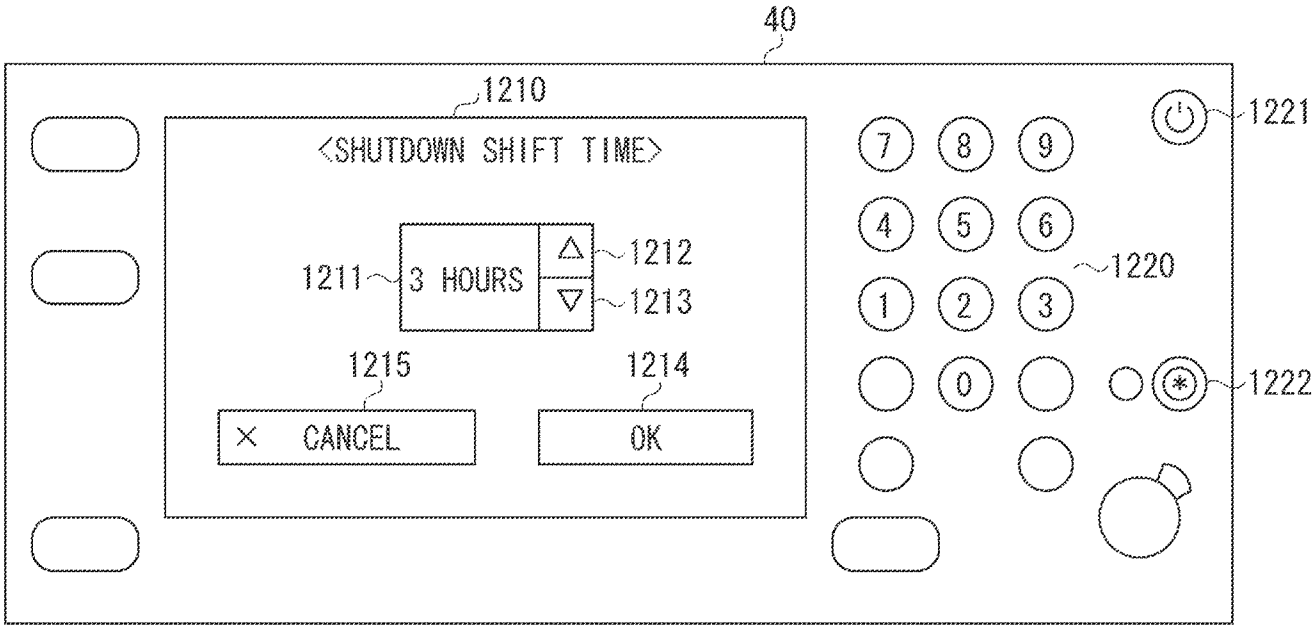
FIG. 6 is a diagram illustrating an operation unit of the MFP.

FIG. 6 is a diagram illustrating the operation unit 40 of the MFP 200 according to the first exemplary embodiment of the present invention. The operation unit 40 will be described in detail with reference to FIG. 6. The operation unit 40 includes a display unit 1210 for displaying various types of setting information, and an input unit 1220 including various keys to be operated by the user.

For example, the display unit 1210 includes a liquid crystal display (LCD), an electroluminescence (EL) display, a light-emitting diode, and/or a paper-like display.

For example, the input unit 1220 includes switches, touch sensors, proximity sensors, and/or optical sensors. Various keys of the input unit 1220 will be described. The input unit 1220 includes a power button 1221 and a setting button 1222. The power button 1221 detects the user's operation and makes the power state of the MFP 200 shift from the normal state 202 or the sleep state 203 to the deep sleep state 204. The power button 1221 also makes the power state of the MFP 200 return from the deep sleep state 204 to the normal state 202 or the sleep state 203. The setting button 1222 is a button for detecting the user's operation to display a setting screen (screen displayed on the display unit 1210 of FIG. 6).

Next, a method for setting the shutdown shift time by using a setting screen of the shutdown shift time displayed on the display unit 1210 when the setting button 1222 is pressed, will be described.

The setting screen displayed on the display unit 1210 of FIG. 6 displays a current setting value 1211 of the shutdown shift time, buttons 1212 and 1213 for changing the setting value of the shutdown shift time, a determination button 1214, and a cancel button 1215. Possible setting values of the shutdown shift time include 0 minutes, 15 minutes, 45 minutes, 1 hour, 2 hours, 3 hours, 4 hours, 8 hours, 12 hours, and 24 hours. The setting screen of FIG. 6 illustrates the case where the setting value of the shutdown shift time is 3 hours. Each time the button 1212 or 1213 is touched by the user's operation, the setting value of the shutdown shift time increases or decreases. If the user touches the determination button 1214, the setting value of the shutdown shift time displayed on the setting screen is determined. The CPU 301 stores the determined value into the shutdown shift time setting value 1301 of the timer setting register 1102. If the user touches the cancel button 1215, the setting screen displayed on the display unit 1210 changes to another screen.

<State Transitions of Power State of MFP 200>

FIG. 7 is a state transition diagram of the power state of the MFP 200 according to the first exemplary embodiment of the present invention.

In the power off state 201 of FIG. 7, the power supply to the MFP 200 is shut off. In the power off state 201, none of the blocks illustrated in FIG. 2 is supplied with power. The power off state 201 is a power state similar to a state where a power breaker is shut off or where a power plug (alternating-current (AC) voltage inlet) is unplugged. In the power off state 201, the CPU 301 is not able to operate because the power supply to each part of the MFP 200 is shut off.

In the normal state 202 of FIG. 7, power is supplied to each part of the MFP 200. In the normal state 202, all the blocks illustrated in FIG. 2 are supplied with power. In the normal state 202, the CPU 301 can operate. In the normal state 202, copying, scanning, and facsimile transmission operations can be performed because power is supplied to all the blocks illustrated in FIG. 2.

In the sleep state 203 of FIG. 7, the power supply to a part of the MFP 200 is stopped. The MFP 200 in the sleep state 203 has power consumption lower than that in the normal state 202. In the sleep state 203, the power supply to the scanner unit 10, the printer unit 20, and the operation unit 40 is stopped. The power supply to the rest of the blocks is maintained. In the sleep state 203, the CPU 301 can operate.

In the deep sleep state 204 of FIG. 7, only a few blocks of the MFP 200 are supplied with power. In the deep sleep state 204, the power supply to the blocks of the MFP 200 is stopped except the RAM 303, the NIC 305, the power supply control unit 50, a not-illustrated detection circuit of the power button 1221 of the operation unit 40, the timer unit 309, a part of the power supply control I/F 308, a part of the external I/F 331, and a part of the FAX unit 60. In the deep sleep state 204, the RAM 303 enters a self-refresh mode. In the deep sleep state 204, the CPU 301 is not able to operate because the power supply to the CPU 301 is stopped.

Next, transition conditions between the states illustrated in FIG. 7 will be described.

The MFP 200 transitions from the power off state 201 to the normal state 202 in response to an on operation of the main switch 501. The MFP 200 transitions from the normal state 202 to the power off state 201 in response to an off operation of the above-described switch 501.

The MFP 200 transitions from the normal state 202 to the sleep state 203 if the MFP 200 has not been operated for a sleep shift time T1 (for example, 15 minutes).

The MFP 200 transitions from the sleep state 203 to the deep sleep state 204 if the MFP 200 has not been operated for a deep sleep shift time T2 (for example, 30 minutes). The deep sleep shift time T2 is the value set in the deep sleep shift time setting value 1302.

The MFP 200 transitions from the sleep state 203 to the normal state 202 if the MFP 200 receives a print job or if the MFP 200 detects an operation of the operation unit 40. The MFP 200 may transition from the deep sleep state 204 to the normal state 202 if the MFP 200 receives a print job or if the MFP 200 detects an operation of the operation unit 40 (power button 1221).

The MFP 200 transitions from the deep sleep state 204 to the sleep state 203 if the MFP 200 receives a packet to which the NIC 305 can make no proxy response.

The MFP 200 transitions from the deep sleep state 204 to the power off state 201 if the MFP 200 has not been operated for a shutdown shift time T3 (for example, three hours). When transitioning from the deep sleep state 204 to the power off state 201, the MFP 200 temporarily transitions from the deep sleep state 204 to the sleep state 203, and then transitions from the sleep state 203 to the power off state 201. The reason for the temporary return to the sleep state 203 is to activate the CPU 301 for the end processing. The shutdown shift time T3 is the value set in the shutdown shift time setting value 1301.

<Operation of NIC>

Figure 8:
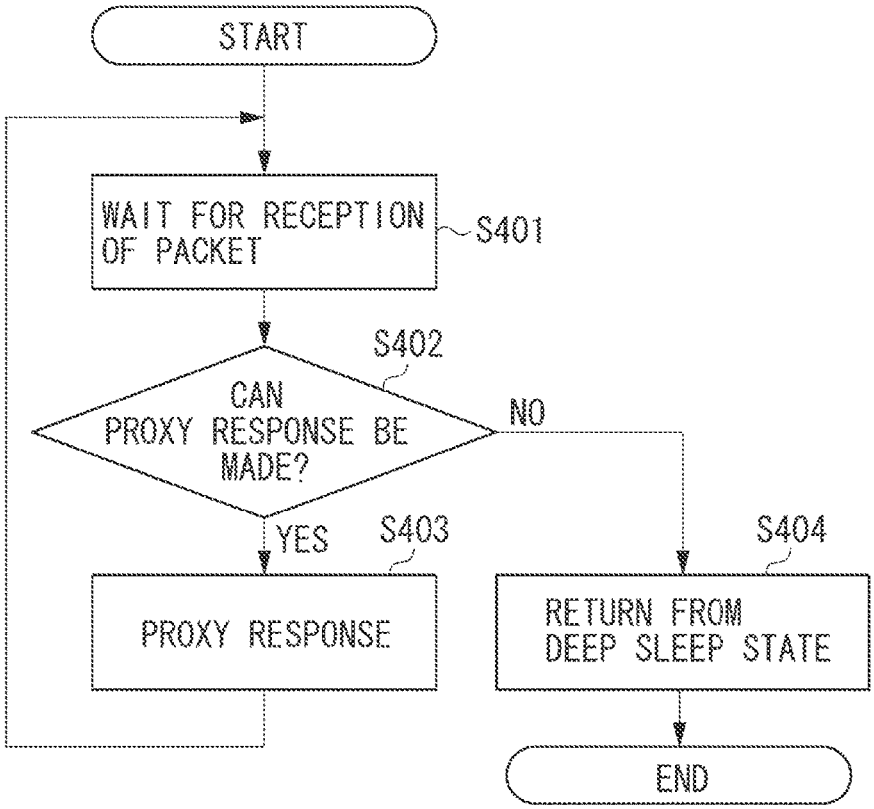
FIG. 8 is a flowchart illustrating an operation of a NIC when the MFP is in a deep sleep state.

If the MFP 200 is in the deep sleep state 204, the NIC 305 can make a proxy response. FIG. 8 illustrates a flowchart corresponding to a program stored in the ROM 321 or the RAM 322 of FIG. 2. When the MFP 200 is in the deep sleep state 204, the program is executed by the CPU 320 of the NIC 305. Referring to FIG. 8, an operation of the NIC 305 when the MFP 200 is in the deep sleep state 204 will be described.

In step S401, the CPU 320 of the NIC 305 waits for reception of a packet on the network 300. In step S402, when having determined that a packet on the network 300 is received, the CPU 320 determines whether a proxy response can be made to the received packet. The CPU 320 determines whether a proxy response can be made by comparing the received packet with a proxy response-capable packet pattern stored in the ROM 321. If the received packet coincides with the proxy response-capable packet pattern stored in the ROM 321, the CPU 320 determines that a proxy response can be made (YES in step S402). On the other hand, if the received packet does not coincide with the proxy response-capable packet pattern stored in the ROM 321, the CPU 320 determines that no proxy response can be made (NO in step S402).

If the CPU 320 determines that a proxy response can be made to the received packet (YES in step S402), then in step S403, the CPU 320 makes a proxy response. In other words, the MFP 200 returns a response to the received packet to the sender of the packet while remaining in the deep sleep state 204.

On the other hand, if the CPU 320 determines that no proxy response can be made (NO in step S402), then in step S404, the CPU 320 controls the PME 326 to notify the power supply control unit 50 that the MFP 200 transitions from the deep sleep state 204 to the sleep state 203 or the normal state 202. Specifically, the CPU 320 controls the PME 326 to change the PME# signal output from the PME 326 to "low." The power supply control I/F 308 receives the PME# signal changed to "low." Receiving the PME# signal, in step S404, the power supply control I/F 308 notifies the power supply control unit 50 that the power state of the MFP 200 transitions from the deep sleep state 204 to the sleep state 203 or the normal state 202.

<Processing Before MFP Shifts to Deep Sleep State>

Figure 9:
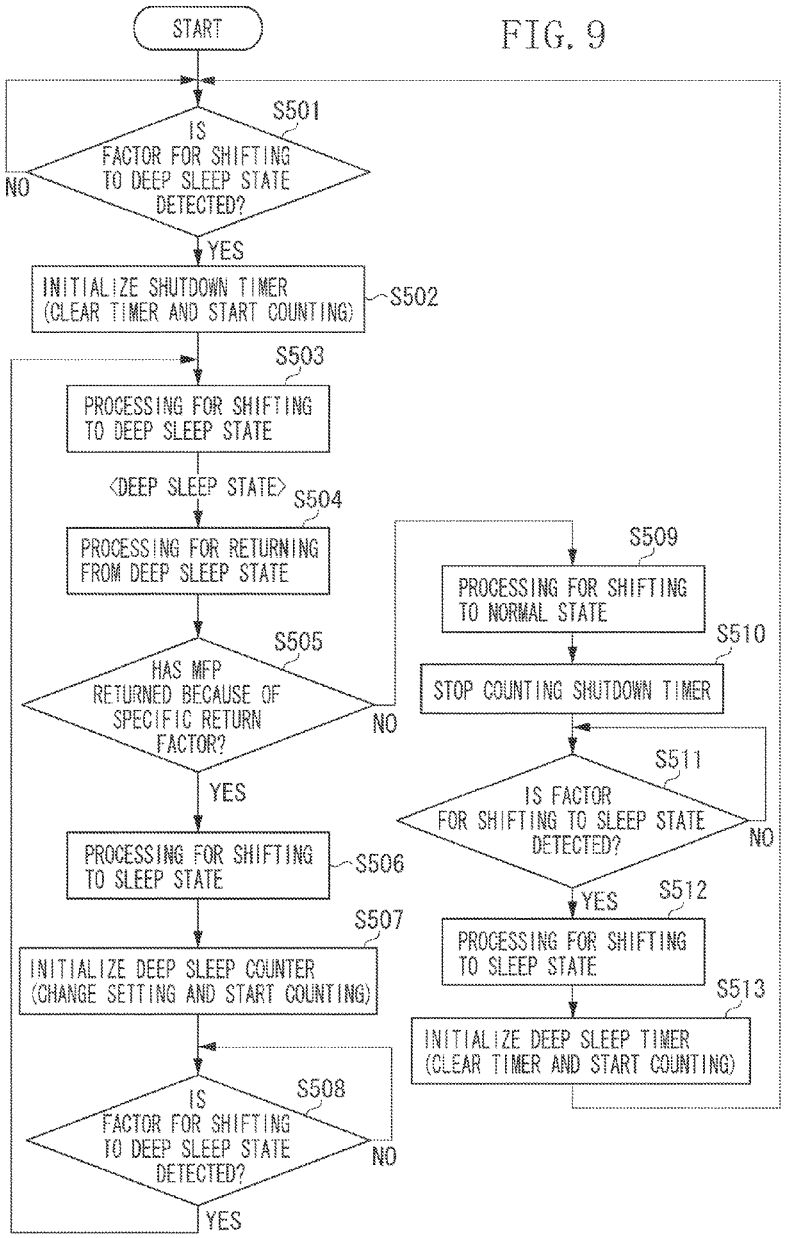
FIG. 9 is a flowchart illustrating processing by which the MFP shifts to the deep sleep state and processing by which the MFP returns from the deep sleep state.

FIG. 9 is a flowchart illustrating processing by which the MFP 200 according to the first exemplary embodiment shifts to the deep sleep state 204 and processing by which the MFP 200 returns from the deep sleep state 204. The flowchart illustrated in FIG. 9 corresponds to the program stored in the ROM 321 or the RAM 322 of FIG. 2. The program is executed by the CPU 301.

In step S501, after the MFP 200 has shifted to the sleep state 203, the CPU 301 determines whether a factor for shifting to the deep sleep state 204 is detected. If the CPU 301 determines that a factor for shifting to the deep sleep state 204 is detected (YES in step S501), then in step S502, the CPU 301 makes the timer unit 309 initialize the shutdown timer 1104. In this initialization processing, the CPU 301 makes the timer unit 309 clear the value of the shutdown timer 1104 and start counting the shutdown timer 1104. The value of the shutdown timer 1104 can be cleared to count time from the current shift to the deep sleep state 204. In step S503, after the CPU 301 has made the timer unit 309 initialize the shutdown timer 1004, the CPU 301 performs processing for shifting to the deep sleep state 204. The MFP 200 then shifts from the sleep state 203 to the deep sleep state 204. Specifically, the CPU 301 makes the power supply control unit 50 turn off the relay 503, the switch 505, the relay 506, and the switch 508. As a result, the power supply to each part is stopped except the RAM 303, the NIC 305, the power supply control unit 50, the detection circuit of the power button 1221 of the operation unit 40, a part of the power supply control I/F 308, the timer unit 309, a part of the external I/F 331, and a part of the FAX unit 60. That is, the power supply to the CPU 301 is stopped. When the MFP 200 shifts from the sleep state 203 to the deep sleep state 204, register values in various units of the controller unit 30 are saved to the RAM 303. In the deep sleep state 204, the RAM 303 enters the self-refresh mode.

<Operation of Timer Unit 309 of MFP 200>

Figure 10:
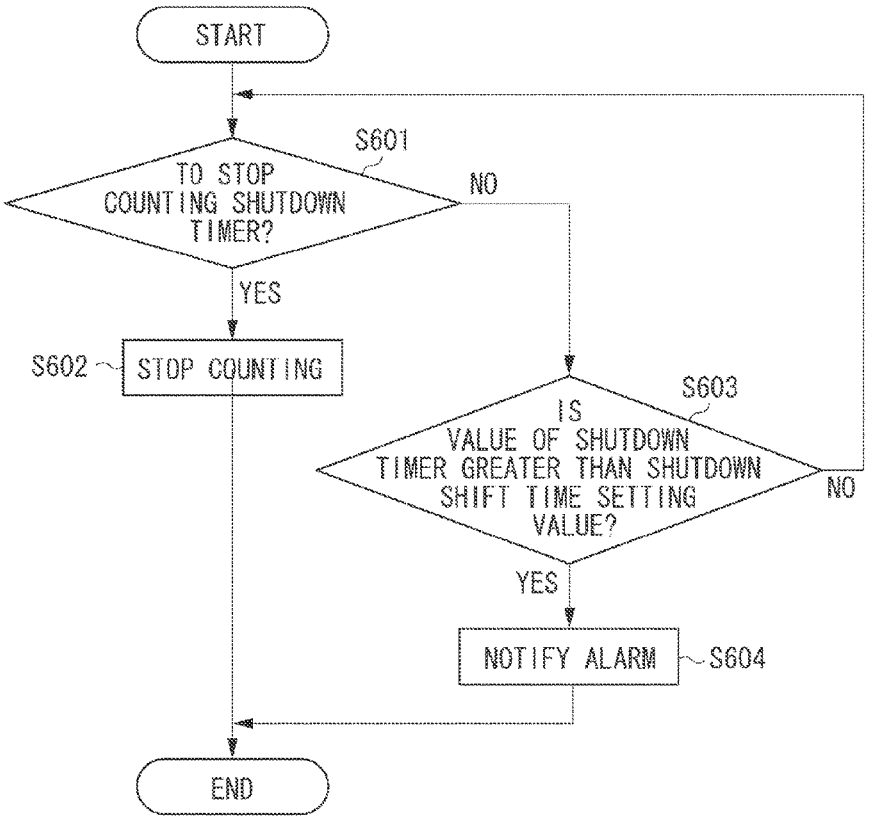
FIG. 10 is a flowchart illustrating processing of the timer unit of the MFP.

Next, an operation of the timer unit 309 when the timer unit 309 is initialized in the above-described step S502 to start counting the shutdown timer 1104, will be described. When the power state of the MFP 200 shifts to the deep sleep state 204, the power supply to the CPU 301 is stopped. Meanwhile, in the deep sleep state 204, the timer unit 309 continues being supplied with power. Consequently, even in the deep sleep state 204, the timer unit 309 can perform processing based on a flowchart illustrated in FIG. 10. The flowchart of FIG. 10 is executed by a logic circuit in the timer unit 309 or a CPU (not illustrated) in the timer unit 309.

In step S601, the timer unit 309 determines whether to stop counting the shutdown timer 1104. If the timer unit 309 is interrupted by a command to stop the shutdown timer 1104 from the CPU 301 in step S510 to be described below (YES in step S601), then in step S602, the timer unit 309 stops counting the shutdown timer 1104.

On the other hand, if the timer unit 309 is not interrupted by a command to stop the shutdown timer 1104 (NO in step S601), then in step S603, the timer unit 309 determines whether the counted shutdown timer 1104 exceeds the preset shutdown shift time setting value 1301. If the timer unit 309 determines that the value of the shutdown timer 1104 is greater than the shutdown shift time setting value 1301 (YES in step S603), then in step S604, the timer unit 309 notifies an alarm to the power supply control unit 50 through the power supply control I/F 308. Specifically, the timer unit 309 notifies the power supply control unit 50 of the shutdown of the MFP 200 by changing the logic of an alarm signal TIRQ# output from the timer unit 309 from "high" to "low."

Receiving the notification of the alarm from the timer unit 309, the power supply control unit 50 makes the power state of the MFP 200 transition from the deep sleep state 204 to the power off state 201. More specifically, the power supply control unit 50, receiving the notification of the alarm from the timer unit 309, makes the power state of the MFP 200 transition to the sleep state 203 once, whereby power is supplied to the CPU 301. The power-supplied CPU 301 performs the end processing of the OS. After the end of the end processing performed by the CPU 301, the power supply control unit 50 makes the power state of the MFP 200 transition to the power off state 201. When the power state of the MFP 200 transitions to the power off state 201, the contents temporarily stored in the RAM 303 are written to the storage unit 317 and/or the NVRAM 304. The power supply control unit 50 may notify devices connected to the network I/F 323 and/or the external IF 331 of the shutdown. The power supply control unit 50 then stops the power supply to each part of the MFP 200.

On the other hand, if the timer unit 309 determines that the value of the shutdown timer 1104 is not greater than the shutdown shift time setting value 1301 yet (NO in step S603), the timer unit 309 continues counting the shutdown timer 1104 and returns to step S601.

<Processing when MFP Returned from Deep Sleep State>

Returning to FIG. 9, processing when the MFP 200 in the deep sleep state 204 has returned from the deep sleep state 204, will be described.

If a deep sleep return factor is detected in the deep sleep state 204, the power supply control unit 50 resumes the power supply to the CPU 301. In step S504, the CPU 301 performs processing for making the MFP 200 return from the deep sleep state 204. When the MFP 200 returns from the deep sleep state 204, the register values saved to the RAM 303 are written back to the units in the controller unit 30. Alternatively, register values may be set again. The RAM 300 returns from the self-refresh mode.

In step S505, the CPU 301 determines the factor for returning from the deep sleep state 204. If the MFP 200 is determined to have returned from the deep sleep state 204 because of a specific return factor (YES in step S505), then in step S506, the CPU 301 controls the MFP 200 to shift to the sleep state 203. For example, if the CPU 301 determines that the MFP 200 has returned because of reception of a specific packet to which no proxy response can be made (YES in step S505), the CPU 301 controls the MFP 200 to shift to the sleep state 203. Examples of the specific packet to which no proxy response can be made include a packet that requires the CPU 301 to inquire device information about the MFP 200 (for example, the remaining amount of consumables such as sheets, ink, and toner) via the image bus I/F 310 and the printer I/F 316. Another example of the specific packet to which no proxy response can be made is a packet that requires the CPU 301 to inquire information about the MFP 200 stored in the storage unit 317 or the NVRAM 304 via the storage unit I/F 318.

In step S506, the MFP 200 shifts to the sleep state 203. In step S507, the CPU 301 makes the timer unit 309 initialize the deep sleep timer 1105. In this initialization processing, the CPU 301 makes the timer unit 309 change the value of the deep sleep shift time setting value 1302 and start counting the deep sleep timer 1105. Specifically, the CPU 301 makes the timer unit 309 change the value of the deep sleep shift time setting value 1302, for example, from "one hour" to "one minute." In step S508, the CPU 301 determines whether a factor for shifting to the deep sleep state 204 is detected. If the CPU 301 determines that a factor for shifting to the deep sleep state 204 is detected (YES in step S508), the CPU 301 returns to step S503 without initializing the shutdown timer 1104 (step S502).

On the other hand, if the MFP 200 is determined to have returned from the deep sleep state 204 because of a factor other than the specific return factor (NO in step S505), then in step S509, the CPU 301 controls the MFP 200 to shift to the normal state 201. For example, if the CPU 301 determines that the MFP 200 has returned because of reception of print data from the PC 100 (NO in step S505), the CPU 301 controls the MFP 200 to shift from the deep sleep state 204 to the normal state 203. In step S510, the CPU 301 makes the timer unit 309 stop counting the shutdown timer 1104. Consequently, in the flowchart illustrated in FIG. 10, the timer unit 309 stops counting the shutdown timer 104 (steps S601 and S602). In step S511, the CPU 301 determines whether a factor for shifting to the sleep state 203 is detected. If the CPU 301 determines that a factor for shifting to the sleep state 203 is detected (YES in step S511), then in step S512, the CPU 301 controls the MFP 200 to shift to the sleep state 203.

After the MFP 200 has shifted to the sleep state 203 in step S512, in step S513, the CPU 301 makes the timer unit 309 initialize the deep sleep timer 1105. In this initialization processing, the CPU 301 makes the timer unit 309 clear the value of the deep sleep timer 1105 and start counting the deep sleep timer 1105. The CPU 301 then returns to step S501. In step S501, the CPU 301 determines whether a factor for shifting to the deep sleep state 204 is detected. If the CPU 301 determines that a factor for shifting to the deep sleep state 204 is detected (YES in step S501), then in step S502, the CPU 301 makes the timer unit 309 initialize the shutdown timer 1104. In this initialization processing, the CPU 301 makes the timer unit 309 clear the value of the shutdown timer 1104 and start counting the shutdown timer 1104.

As described above, if the MFP 200 has returned because of the specific return factor, the CPU 301 does not return to step S502 and the shutdown timer 1104 is not initialized. Since the counting of the shutdown timer 1104 continues, the shutdown function works regardless of whether the MFP 200 returns from the deep sleep state 204. This eliminates the inconvenience that the shutdown timer 1104 is initialized each time the MFP 200 returns temporarily from the deep sleep state 204, and the shutdown function keeps failing to work.

<About Transitions of Power State of MFP>

Figure 11A:
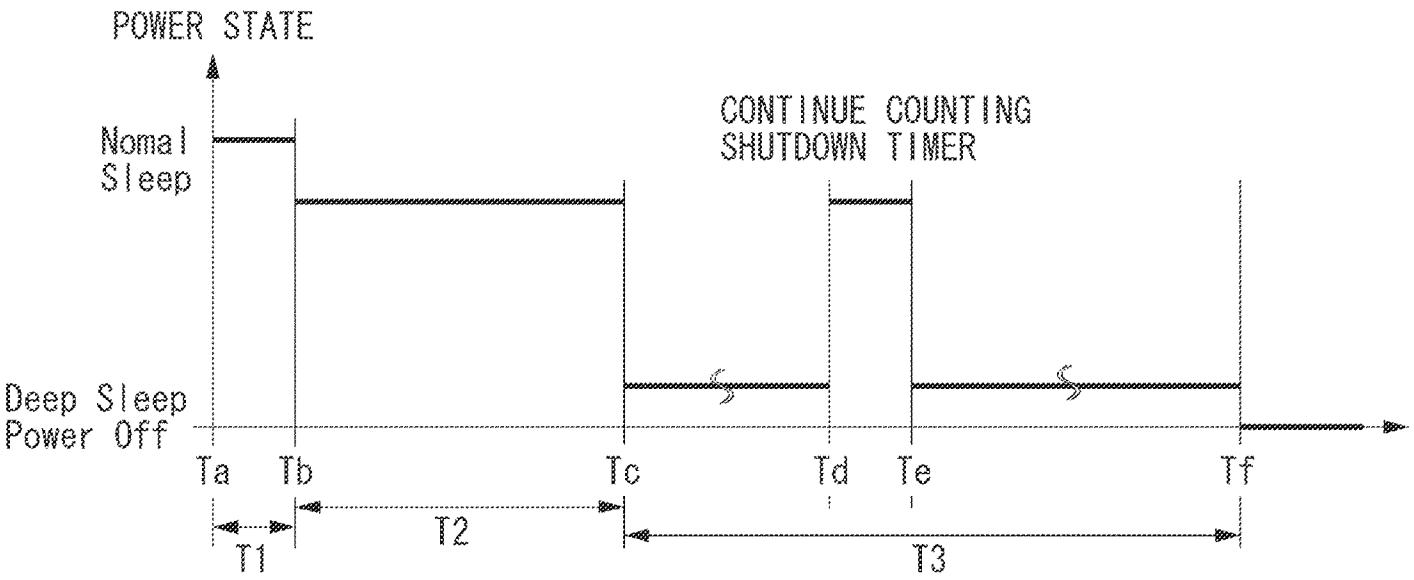
FIG. 11A is a time chart illustrating changes of the power state of the MFP in a time series (when the MFP returns from the deep sleep state because of a specific return factor).
Figure 11B:
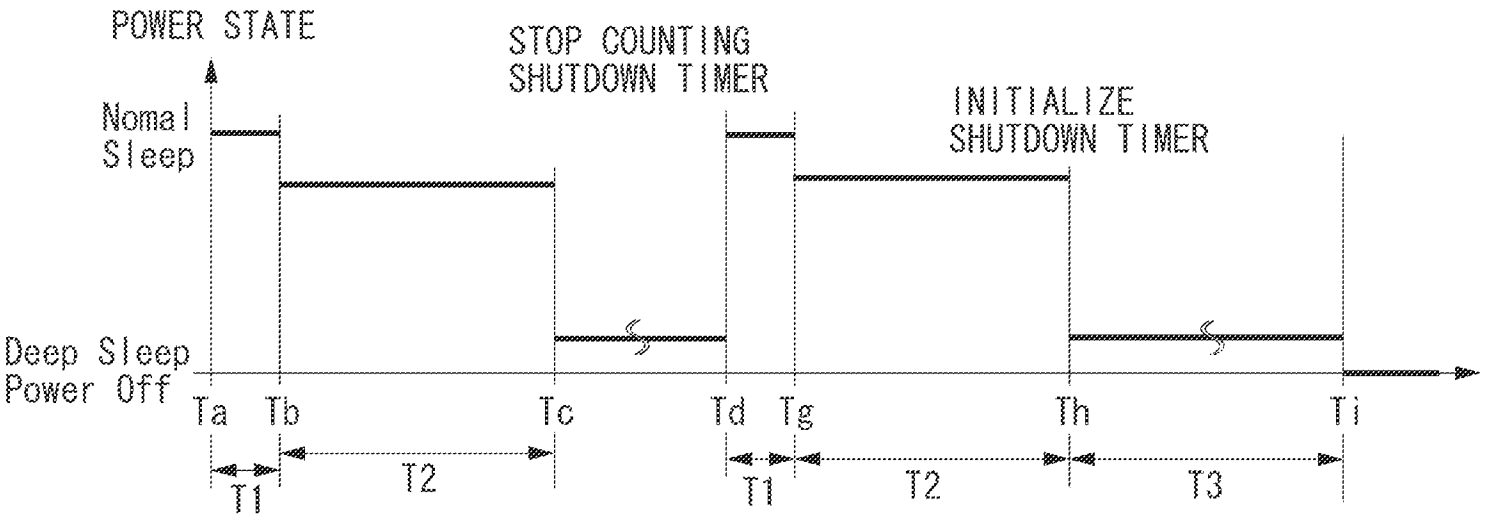
FIG. 11B is a time chart illustrating changes of the power state of the MFP in a time series (when the MFP returns from the deep sleep state because of a factor other than the specific return factor).

FIGS. 11A and 11B are time charts illustrating transitions of the power state of the MFP 200 in a time series. The transitions of the power state of the MFP 200 according to the first exemplary embodiment will be described with reference to FIGS. 11A and 11B. In the first exemplary embodiment, the following values are set in the timer setting register 1102 of the timer unit 309:

The sleep shift time setting value 1304: 15 minutes (the time elapsed in shifting from the normal state 202 to the sleep state 203 (hereinafter, referred to as T1 when needed));

The deep sleep shift time setting value 1302: 1 hour (the time elapsed in shifting from the sleep state 203 to the deep sleep state 204 (hereinafter, referred to as T2 when needed)); and The shutdown shift time setting value 1301: 3 hours (the time to elapse before shifting from the deep sleep state 204 to the power off state 201 (hereinafter, referred to as T3 when needed)).

Initially, a case where the MFP 200 returns from the deep sleep state 204 to the sleep state 203 because of the specific return factor (for example, the reception of a specific packet to which no proxy response can be made) will be described with reference to FIG. 11A.

In FIG. 11A, the MFP 200 in the normal state 202 becomes idle at time Ta. Being idle refers to being in a job wait state where none of copying, scanning, and facsimile transmission operations is performed.

If the MFP 200 has been idle for the time T1 (from time Ta to time Tb), the timer unit 309 issues an alarm. Receiving the alarm from the timer unit 309, the power supply control unit 50 shifts the power state of the MFP 200 from the normal state 202 to the sleep state 203.

If the MFP 200 shifted to the sleep state 203 has been in the sleep state 203 for the time T2 (from time Tb to time Tc), the timer unit 309 issues an alarm. Receiving the alarm, the power supply control unit 50 shifts the power state of the MFP 200 from the sleep state 203 to the deep sleep state 204.

Suppose that the MFP 200 shifted to the deep sleep state 204 temporarily shifts from the deep sleep state 204 to the sleep state 203 because of the reception of a packet to which no proxy response can be made. Even in such a case, in the present exemplary embodiment, the MFP 200 transitions to the power off state 201 at time Tf after the lapse of the time T3 since time Tc. At time Tf, the timer unit 309 issues an alarm. Receiving the alarm, the power supply control unit 50 temporarily shifts the power state of the MFP 200 from the deep sleep state 204 to the sleep state 203 to supply power to the CPU 301 that performs the end processing. This allows the CPU 301 to perform the end processing of the OS. The CPU 301 then performs the end processing, and the power supply control unit 50 shifts the power state of the MFP 200 from the sleep state 203 to the power off state 201.

Suppose that the MFP 200 receives a specific packet to which no proxy response can be made at a time Td when the timer unit 309 is counting the time T3. In such a case, in the present exemplary embodiment, the MFP 200 shifts from the deep sleep state 204 to the sleep state 203 to respond to the packet. As a result, the CPU 301 can respond to the packet. At a time Te when the response of the CPU 301 to the packet is completed, the MFP 200 shifts to the deep sleep state 204. As described above, if the MFP 200 was activated because of the specific return factor, the deep sleep shift time setting value 1302 was changed from one hour to one minute (see step S507). The MFP 200 thus shifts to the deep sleep state 204 soon after the completion of the response to the packet.

As has been described above, in the present exemplary embodiment, when the MFP 200 returns from the deep sleep state 204 because of the specific return factor, the shutdown timer 1104 is not initialized but continues being counted. Consequently, even if the MFP 200 temporarily returns from the deep sleep state 204, the MFP 200 shifts to the power off state 201 at time Tf after the time T3 has elapsed since time Tc when the MFP 200 shifted to the deep sleep state 204.

Next, a case where the MFP 200 returns from the deep sleep state 204 to the normal state 202 because of a factor other than the specific return factor (for example, the reception of print data), will be described with reference to FIG. 11B.

In FIG. 11B, the MFP 200 in the normal state 202 becomes idle at time Ta.

If the MFP 200 has been idle for the time T1 (from time Ta to time Tb), the timer unit 309 issues an alarm. Receiving the alarm from the timer unit 309, the power supply control unit 50 shifts the power state of the MFP 200 from the normal state 202 to the sleep state 203.

If the MFP 200 shifted to the sleep state 203 has been in the sleep state 203 for the time T2 (from time Tb to time Tc), the timer unit 309 issues an alarm. Receiving the alarm, the power supply control unit 50 shifts the power state of the MFP 200 from the sleep state 203 to the deep sleep state 204.

If the NIC 305 receives print data before the time T3 has elapsed since the shift of the MFP 200 to the deep sleep state 204, the MFP 200 shifts from the deep sleep state 204 to the normal state 202. If the MFP 200 having shifted to the normal state 202 has been idle for the time T1 (from time Td to time Tg), the timer unit 309 issues an alarm. Receiving the alarm from the timer unit 309, the power supply control unit 50 shifts the power state of the MFP 200 from the normal state 202 to the sleep state 203.

If the MFP 200 shifted to the sleep state 203 has been in the sleep state 203 for the time T2 (from time Tg to time Th), the time unit 309 issues an alarm. Receiving the alarm from the timer unit 309, the power supply control unit 50 shifts the power state of the MFP 200 from the sleep state 203 to the deep sleep state 204.

If the MFP 200 shifted to the deep sleep state 204 has been in the deep sleep state 204 for the time T3 (from time Th to time T1), the timer 309 issues an alarm. Receiving the alarm from the timer unit 309, the power supply control unit 50 shifts the power state of the MFP 200 from the deep sleep state 204 to the power off state 201. As described above, the MFP 200 temporarily returns to the sleep state 203 when shifting from the deep sleep state 204 to the power off state 201.

<Effect of First Exemplary Embodiment>

In the present exemplary embodiment, the counting of the shutdown timer 1104 is not stopped if the MFP 200 shifts from the deep sleep state 204 to the sleep state 203 because of the specific return factor. As a result, the MFP 200 can shift to the power off state 201 after the time T3 indicated by the shutdown time setting value 1301 has elapsed from time Tc when the MFP 200 has shifted to the deep sleep state 204. This solves the problem that the MFP 200 keeps failing to shift to the power off state 201 because the MFP 200 returns from the deep sleep state 204.

In the present exemplary embodiment, if the MFP 200 returns from the deep sleep state 204 to the sleep state 203 because of the specific return factor, the value of the deep sleep shift time setting value 1302 is changed (for example, from one hour to one minute). This allows the MFP 200 to quickly shift from the sleep state 203 to the deep sleep state 204. In other words, the MFP 200 that has temporarily shifted from the deep sleep state 204 to the sleep state 203 because of the specific return factor can quickly shift to the deep sleep state 204.

<Modifications>

The above-described exemplary embodiment has dealt with the case where the specific return factor is the reception of a packet to which the NIC 305 can make no proxy response. However, the specific return factor according to the exemplary embodiment of the present invention is not limited thereto.

For example, the MFP 200 may be configured not to clear the shutdown timer 1104 if the MFP 200 returns from the deep sleep state 204 to the sleep state 203 to perform the following specific operation 1 or specific operation 2.

The specific operation 1 includes regularly rotating a conveyance roller (not illustrated) mounted on the scanner unit 10 or the printer unit 20 of the MFP 200 to avoid deformation of the conveyance roller. The specific operation 2 includes regularly activating a photosensitive drum (not illustrated) or a fixing device (not illustrated) mounted on the scanner unit 10 or the printer unit 20 of the MFP 200 for maintenance purposes. Examples of the specific return factor may include: that the power supply button 1221 of the operation unit 40 is detected by a not-illustrated detection circuit; that the timer unit 309 causes interrupt processing to occur; that the FAX unit 60 receives a FAX message; that an external device is connected to the external I/F 331; and that a not-illustrated identification (ID) card reader connected to the external I/F 331 detects an ID card.

The above-described interrupt processing of the timer unit 309 may be executed at a preset date and time or at predetermined time intervals based on a result of comparison between the value set in the deep sleep return date and time setting value 1303 and the current date and time measured by the RTC 1107.

The above-described exemplary embodiment has dealt with the MFP 200 as an example of an information processing apparatus. However, the exemplary embodiment of the present invention is not limited to the MFP 200. An information processing apparatus according to the exemplary embodiment of the present invention may be an inkjet printer. The inkjet printer may be configured not to clear the shutdown timer 1104 if the inkjet printer returns from the deep sleep state 204 to perform processing for regularly cleaning (suctioning and/or wiping) drying ink.

The shutdown shift time setting value 1301 has been described to be set by the user's operation on the operation unit 40, using the setting screen (see FIG. 6). However, in the exemplary embodiment of the present invention, the shutdown shift time may be automatically set based on a device's life and a power status. The PC 100 may remotely set the shutdown shift time setting value 1301.

The above-described exemplary embodiment has dealt with the case where the counting of the shutdown time 1104 continues if the MFP 200 has shifted from the deep sleep state 204 to the sleep state 203 because of the specific return factor. However, the exemplary embodiment is not limited thereto. Even if the MFP 200 has shifted from the deep sleep state 204 to the sleep state 203 because of the specific return factor, the shutdown timer 1104 may be stopped when a hard disk drive (HDD; the storage unit 314) is accessed.

Even if the MFP 200 has shifted from the deep sleep state 204 to the sleep state 203 because of the specific return factor, the shutdown timer 1104 may be stopped when there is a reserved job at a specified time.

Consequently, even if the MFP 200 has shifted from the deep sleep state 204 to the sleep state 203 because of the specific return factor, the shutdown timer 1104 can be prevented from being counted to execute the shutdown function when the HDD is accessed or when a reserved job occurs.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-117752 filed May 23, 2012, which is hereby incorporated by reference herein in its entirety.

What is claimed is:

1. An information processing apparatus operating in a first power state, a second power state with power consumption lower than that of the first power state, a third power state with power consumption lower than that of the second power state, and a fourth power state with power consumption lower than that of the third power state, the information processing apparatus comprising:

*a printer configured to form an image on a sheet;* a [time measurement unit] *timer* configured to measure time;

a power [control unit] *controller* configured to shift a power state of the information processing apparatus which is in the third power state (1) from the third power state to the fourth power state [when] *in a case where* a first shift time is measured by the [time measurement unit] *timer*, (2) from the third power state to the second power state [when] *in a case where* a first shift factor for shifting the information processing apparatus from the third power state to the second power state occurs before the first shift time is measured by the [time measurement unit] *timer*, and (3) from the third power state to the first power state [when] *in a case where* a second shift factor for shifting the information processing apparatus from the third power state to the first power state occurs before the first shift time is measured by the [time measurement unit] *timer*; and a [control unit] *controller* configured to, [when] *in a case where* the power [control unit] *controller* has shifted the power state of the information processing apparatus from the third power state to the first power state, clear the time measured by the [time measurement unit] *timer*, and not to, [when] *in a case where* the power [control unit] *controller* has shifted the power state of the information processing apparatus from the third power state to the second power state in accordance with an occurrence of the first shift factor, clear the time measured by the [time measurement unit] *timer*, wherein the fourth power state is a turned off state.

2. The information processing apparatus according to claim 1, further comprising a network interface [unit] configured to be able to respond to a packet transmitted from an external apparatus via a network, wherein the first shift factor is to receive a packet to which the network interface [unit] is not able to respond.

3. The information processing apparatus according to claim 2, wherein the packet to which the network interface [unit] is not able to respond includes a packet for inquiring device information about the information processing apparatus.

4. The information processing apparatus according to claim 1, [further comprising an image forming unit configured to form an image on a sheet,]

wherein the second shift factor is to receive a packet [that cause] *which causes* the [image forming unit] *printer* to form an image on a sheet.

5. The information processing apparatus according to claim 1, wherein the [time measurement unit] *timer* starts to measure the time when the power state of the image processing apparatus is shifted to the second power state or the third power state.

6. A method for controlling an information processing apparatus operating in a first power state, a second power state with power consumption lower than that of the first power state, a third power state with power consumption lower than that of the second power state, and a fourth power state with power consumption lower than that of the third power state, the method comprising:

measuring*, by a timer configured to measure time,* time when a power state of the image processing apparatus is shifted to the second power state or the third power state[.]*;* shifting the power state of the information processing apparatus from the third power state to the fourth power state [when] *in a case where* a first shift time is measured by [a time measurement unit configured to measure time] *the timer*; *and* clearing the time measured by the [time measurement unit when] *timer in a case where* the power state of the information processing apparatus is shifted from the third power state to the first power state, wherein the time measured by the [time measurement unit] *timer* is not cleared [when] *in a case where* the power state of the information processing apparatus is shifted from the third power state to the second power state in accordance with an occurrence of the first shift factor,

*wherein the information processing apparatus comprises a printer configured to form an image on a sheet and a controller configured to control at least the printer, and* wherein the fourth power state is a turned off state.

7. A non-transitory storage medium storing a program for causing a computer to perform a method for controlling an information processing apparatus operating in a first power state, a second power state with power consumption lower than that of the first power state, a third power state with power consumption lower than that of the second power state, and a fourth power state with power consumption lower than that of the third power state, the method comprising:

measuring, *by a timer configured to measure time,* time when a power state of the image processing apparatus is shifted to the second power state or the third power state;

shifting the power state of the information processing apparatus from the third power state to the fourth power state [when] *in a case where* a first shift time is measured by [a time measurement unit configured to measure time] *the timer*; and clearing the time measured by the [time measurement unit when] *timer in a case where* the power state of the information processing apparatus is shifted from the third power state to the first power state, wherein the time measured by the [time measurement unit] *timer* is not cleared [when] *in a case where* the power state of the information processing apparatus is shifted from the third power state to the second power state in accordance with an occurrence of the first shift factor,

*wherein the information processing apparatus comprises a printer configured to form an image on a sheet and a controller configured to control at least the printer, and* wherein the fourth power state is a turned off state.

*8. The information processing apparatus according to claim 1,*

*wherein in a case where the information processing apparatus is in the second power state, power supply for the printer is restricted, and*

*wherein in a case where the information processing apparatus is in the third power state, power supply for the printer and the controller are restricted.*

*9. The information processing apparatus according to claim 8,*

*wherein in a case where the information processing apparatus is in the second power state, power supply for the controller is not restricted.*

*10. The information processing apparatus according to claim 9, wherein in a case where the information processing apparatus is in the third power state, power supply for a CPU of the controller is stopped.*

*11. The information processing apparatus according to claim 8, wherein in a case where the information processing apparatus is in the third power state, power supply for a CPU of the controller is stopped.*

*12. The method according to claim 6,*

*wherein in a case where the information processing apparatus is in the second power state, power supply for the printer is restricted, and*

*wherein in a case where the information processing apparatus is in the third power state, power supply for the printer and the controller are restricted.*

*13. The method according to claim 12,*

*wherein in a case where the information processing apparatus is in the second power state, power supply for the controller is not restricted.*

*14. The non-transitory storage medium according to claim 7,*

*wherein in a case where the information processing apparatus is in the second power state, power supply for the printer is restricted, and*

*wherein in a case where the information processing apparatus is in the third power state, power supply for the printer and the controller are restricted.*

*15. The non-transitory storage medium according to claim 14,*

*wherein in a case where the information processing apparatus is in the second power state, power supply for the controller is not restricted.*

*16. An information processing apparatus that is able to operate in a first power state, a second power state with power consumption lower than that of the first power state, a third power state with power consumption lower than that of the second power state, and a fourth power state with power consumption lower than that of the third power state, the information processing apparatus comprising:*

*a printer configured to form an image on a sheet;*

*a timer configured to measure time;*

*a power controller configured to shift a power state of the information processing apparatus which is in the third power state*

*(1) from the third power state to the fourth power state in a case where a first shift time is measured by the timer,*

*(2) from the third power state to the second power state in a case where a first shift factor for shifting the information processing apparatus from the third power state to the second power state occurs before the first shift time is measured by the timer, and*

*(3) from the third power state to the first power state in a case where a second shift factor for shifting the information processing apparatus from the third power state to the first power state occurs before the first shift time is measured by the timer; and*

*a controller configured to, in a case where the power controller has shifted the power state of the information processing apparatus from the third power state to the first power state, clear the time measured by the timer, and not to, in a case where the power controller has shifted the power state of the information processing apparatus from the third power state to the second power state, clear the time measured by the timer,*

*wherein the fourth power state is a turned off state, and*

*wherein the information processing apparatus in the third power state receives a predetermined packet from an external device and then sends a response for the received predetermined packet to the external device with the information processing apparatus remaining in the third power state.*

*17. The information processing apparatus according to claim 16, further comprising a network interface configured to be able to respond to a packet transmitted from an external apparatus via a network,*

*wherein the first shift factor is to receive a packet to which the network interface is not able to respond.*

*18. The information processing apparatus according to claim 17, wherein the packet to which the network interface is not able to respond includes a packet for inquiring device information about the information processing apparatus.*

*19. The information processing apparatus according to claim 16,*

*wherein the second shift factor is to receive a packet which causes the printer to form an image on a sheet.*

*20. The information processing apparatus according to claim 16, wherein the timer starts to measure the time when the power state of the image processing apparatus is shifted to the second power state or the third power state.*

*21. The information processing apparatus according to claim 16,*

*wherein in a case where the information processing apparatus is in the second power state, power supply for the printer is restricted, and*

*wherein in a case where the information processing apparatus is in the third power state, power supply for the printer and power supply for the controller are restricted.*

*22. The information processing apparatus according to claim 16,*

*wherein in a case where the information processing apparatus is in the second power state, power supply for the controller is not restricted.*

*23. A method for controlling an information processing apparatus that is able to operate in a first power state, a second power state with power consumption lower than that of the first power state, a third power state with power consumption lower than that of the second power state, and a fourth power state with power consumption lower than that of the third power state, the method comprising:*

*measuring, by a timer configured to measure time, time when a power state of the image processing apparatus is shifted to the second power state or the third power state;*

*shifting the power state of the information processing apparatus from the third power state to the fourth power state in a case where a first shift time is measured by the timer; and*

*clearing the time measured by the timer in a case where the power state of the information processing apparatus is shifted from the third power state to the first power state, wherein the time measured by the timer is not cleared in a case where the power state of the information processing apparatus is shifted from the third power state to the second power state in accordance with an occurrence of the first shift factor,*

*receiving a predetermined packet from an external device in the third power state, and then,*

*sending a response for the received predetermined packet to the external device with the information processing apparatus remaining in the third power state,*

*wherein the information processing apparatus comprises a printer configured to form an image on a sheet and a controller configured to control at least the printer, and*

*wherein the fourth power state is a turned off state.*

* * * * *